(12) United States Patent
Bruck et al.

(10) Patent No.: US 9,175,373 B2
(45) Date of Patent: Nov. 3, 2015

(54) INERTIA FRICTION WELD OF SUPERALLOY WITH ENHANCED POST WELD HEAT TREATMENT

(75) Inventors: Gerald J. Bruck, Oviedo, FL (US); Timothy V. Stotler, Columbus, OH (US); Wendell L. Johnson, Troy, OH (US)

(73) Assignee: Siemens Energy, Inc., Orlando, FL (US)

( * ) Notice: Subject to any disclaimer, the term of this patent is extended or adjusted under 35 U.S.C. 154(b) by 1002 days.

(21) Appl. No.: 13/027,308

(22) Filed: Feb. 15, 2011

(65) Prior Publication Data

US 2012/0205014 A1    Aug. 16, 2012

(51) Int. Cl.
*C22F 1/10* (2006.01)
*C22C 19/05* (2006.01)
*B23P 6/04* (2006.01)

(52) U.S. Cl.
CPC . *C22F 1/10* (2013.01); *B23P 6/045* (2013.01); *C22C 19/057* (2013.01)

(58) Field of Classification Search
CPC .......................................................... C22F 1/10
USPC ............ 148/527, 675–677; 228/112.1–114.5, 228/119
See application file for complete search history.

(56) References Cited

U.S. PATENT DOCUMENTS

| 5,111,990 | A * | 5/1992 | Thrower et al. ............... 228/113 |
| 5,529,643 | A | 6/1996 | Yoon et al. |
| 6,531,005 | B1 * | 3/2003 | Bezerra et al. ............... 148/516 |
| 6,883,700 | B2 | 4/2005 | Kottilingam et al. |
| 6,969,238 | B2 | 11/2005 | Groh et al. |
| 7,300,708 | B2 | 11/2007 | Gigliotti, Jr. et al. |
| 2004/0056075 | A1 | 3/2004 | Gheorghe |
| 2006/0049234 | A1 | 3/2006 | Flak et al. |
| 2010/0040471 | A1 | 2/2010 | Izadi |

* cited by examiner

*Primary Examiner* — Brian Walck

(57) ABSTRACT

A method of inertia friction welding a superalloy substrate, the method including: rotating and forcing a deposit material (110) against the superalloy substrate (100); plastically deforming at least one of the deposit material (110) and the superalloy substrate (100) to form a weld joining the deposit material (110) to the superalloy substrate (100), thereby forming an assembly; and heat-treating the assembly. Heat-treating includes: a post-weld intermediate stress-relief (ISR) treatment; a solutionizing treatment; and a precipitation hardening heat treatment.

18 Claims, 4 Drawing Sheets

INERTIA FRICTION WELD OF SUPERALLOY WITH ENHANCED POST WELD HEAT TREATMENT

FIELD OF THE INVENTION

The invention relates to the field of post weld heat treatment of precipitation hardened superalloys.

BACKGROUND OF THE INVENTION

Conventional welding of precipitation hardened superalloys, (iron, nickel, and cobalt based), is particularly difficult because of solidification cracking and strain age cracking. Solidification cracking may occur during the welding process and strain age cracking may occur during a post weld heat treatment (PWHT) or exposure to high temperatures while in service. Arc welding, laser welding, electron beam welding, and similar processes melt the difficult-to-weld substrate. Cracking during resultant solidification is particularly difficult to avoid. Alternately, friction welding has been employed because friction welding only plasticizes the substrate without causing melting, thereby avoiding solidification cracking. However, friction welding has other disadvantages. For example, friction stir welding of superalloys is limited by short life of friction stir weld tool materials. A state of the art, high temperature poly crystalline boron nitride (PCBN) friction stir tool may be severely compromised after forming less than twelve inches of weld. Furthermore, high residual stresses are induced by the high forces involved in friction processing. These residual stresses can result in cracking (i.e. strain age cracking) during subsequent high temperature exposure.

Inertia friction welding (IFW) avoids solidification cracking and also avoids the problems of limited tool life associated with friction stir welding because in IFW the tool (i.e. rotating element) is incorporated into the friction process and is deposited onto and essentially forged onto the substrate. In the process a pin of material to be deposited is fixed in a chuck encompassed by a flywheel. The assembly is rotated to a high level of momentum. The motor is disengaged and the pin is forced under high pressure against a fixed substrate it is to be welded to. Material is plasticized by friction between the pin and substrate and is extruded out from the interface. An assembly where a pin has been inertia friction welded to a substrate can be seen in FIG. 1. Conventionally the welded assembly is subjected to a PWHT, after which cracks are often found in the weld. Such a crack can be seen in FIG. 2, across the interface where the pin material meets the substrate material. Consequently, there remains room in the art for a weld process and heat treatment that does not produce cracks in the weld of precipitation hardened superalloys.

BRIEF DESCRIPTION OF THE DRAWINGS

The invention is explained in the following description in view of the drawings that show.

DETAILED DESCRIPTION OF THE INVENTION

Figure 1:
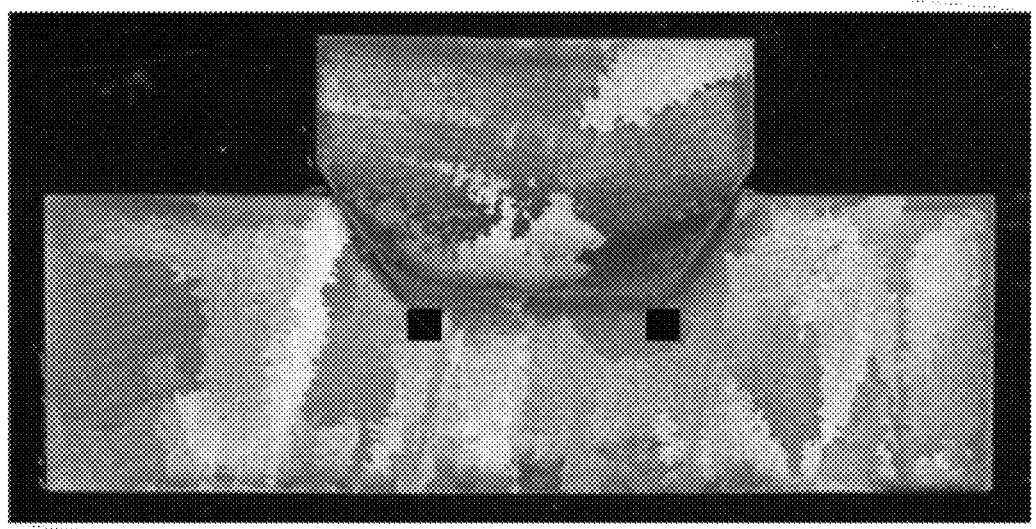
FIG. 1 is a photomicrograph of a prior art plug inertia friction welded to a substrate.
Figure 2:
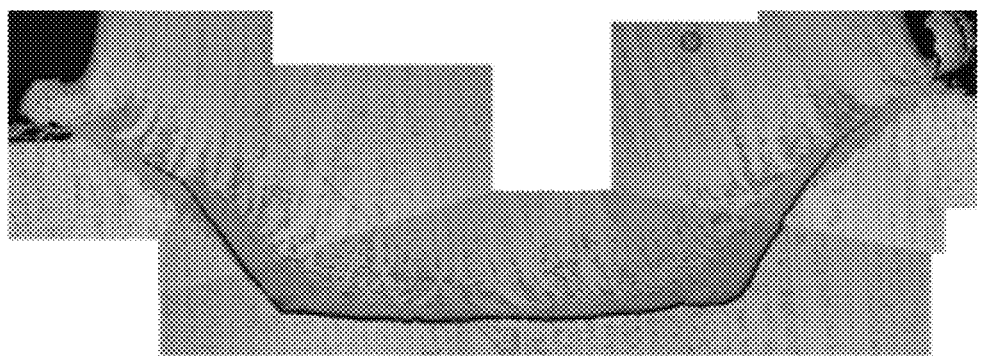
FIG. 2 is a photomicrograph of a prior art inertia friction weld with a crack developed during PWHT.

The present inventor has ascertained that residual stresses in friction welded precipitation hardened superalloy assemblies may be extremely high, that conventional PWHT may not accommodate these high levels of residual stresses, and that cracking that occurs during PWHT may be the result of these high levels of residual stresses. As such, the inventor has proposed an innovative intermediate stress relief (ISR) to be performed prior to the conventional PWHT of precipitation hardened superalloys. The ISR relieves the residual stresses present in the weld, and welds subject to the ISR prior to the conventional PWHT have been found to have fewer or no cracks. Without being bound to any particular theory, it is believed that the presence of these residual stresses during PWHT is part of the mechanism that causes the strain age cracking, and so relieving the residual stress prior to PWHT reduces or eliminates the strain age cracking that occurs during PWHT.

Precipitation hardened (i.e. precipitation strengthened) superalloys may be subjected to a PWHT in order to develop maximum strength in a final assembly. Maximum strength is the result of proper (i.e. homogenous) distribution of precipitates throughout the material, as well as a proper volume of precipitates etc. Prior to welding a precipitation hardened superalloy the precipitates present in the pin and/or substrate may be reduced from a maximum-strength level by an appropriate heat treatment to increase ductility in order to facilitate welding. During the welding process of a precipitation hardened superalloy a uniformity of the distribution of the precipitates may be disturbed. In order to return to a desired uniformity and volume etc of the precipitates in the final assembly (and weld), the assembly is subjected to a conventional PWHT. Conventional PWHT of a welded precipitation hardened superalloy is a two step process where the assembly is treated at a solutionizing temperature, and then treated at an aging temperature (i.e. precipitation strengthening or precipitation hardening temperature). During the solutionizing treatment alloying elements in the assembly are returned to solution and are free to diffuse uniformly throughout the assembly microstructure. As a result the alloying elements transition from a non-uniform distribution to a more uniform distribution. During aging, the more uniformly distributed alloying elements fall out of solution and form precipitates that increase the strength of the substrate.

Secondarily, during both PWHT processes residual stresses may be relieved to some degree. Cold working, such as that which happens during friction welding, induces high levels of residual stresses due to dislocations and tangles etc in the microstructure. When heated the microstructure may realign its microstructure to varying degrees, which in turn reduces the cold work induced residual stresses. However, the residual stresses may not be relieved entirely during the PWHT, and it is also sometime during the PWHT that cracks form. It is believed that a combination of low ductility (possibly resulting from the formation of precipitates) and high residual stresses (possibly resulting from cold working during welding and possibly material shrinkage during precipitation formation) may contribute to crack formation. However, it is unknown exactly what mechanism or combination of mechanisms is causing the cracks to form, and at what point(s) in the PWHT the cracking occurs. Thus, in an embodiment the inventor proposes to relieve residual stresses prior to any of the conventional PWHT processes. As a result, in an embodiment the proposed ISR seeks to permit realignment of the microstructure, for example by reforming of crystals, thereby reducing residual stress, but seeks to do so without solutionizing and without permitting too much (or any) precipitation formation. However, reduction of residual stresses may be achieved by alternate heat treatments that may overlap processes involved in conventional PWHT, and such alternate heat treatments are envisioned to be within the scope of this disclosure. For example, the ISR treatment may overlap or be made part of the solutionizing temperature under conditions when cracking is found to occur primarily during the aging process or later in the solutionizing process etc.

The ISR treatment seeks to reduce residual stress, but not to an exact level or by an exact amount. The ISR treatment will reduce residual stress in friction welded superalloys more than occurs in conventional PWHT of friction welded superalloys. Specifically, the ISR treatment will reduce residual stress more than any incidental residual stress reduction that occurs during any of: heating (ramping up) of an assembly to a solutionizing temperature of conventional PWHT; during the solutionizing process of conventional PWHT; and during the aging process of conventional PWHT. Applicant considers approximately a 20% reduction in residual stresses to be more than incidental.

It has been measured experimentally that residual stresses present in the assembly weld after welding are at least of the order of 43% of the material yield strength. In other certain locations residual stresses likely approach 100% of yield strength (as is common in most welds). Given that residual stresses will vary throughout a weld, absolute stress reductions and percentages of stress reduction may vary throughout a weld. For example, stress in a significant portion of the weld may be 43% of the yield strength and in another portion may be 100%. Both areas may experience a stress reduction due to the ISR heat treatment, but the significant portion may not respond exactly like the other portion, and thus the amount of stress reductions, in absolute and in percentage terms, of the significant portion may vary from that of the other portion for example. However, both will experience more than incidental stress reduction. Thus, a stress reduction as described herein refers to a reduction in stress for a given location within a weld.

It has been measured experimentally that ISR will reduce a residual stress in an assembly to as little as 3% of that material's yield strength. For example, for a gamma prime strengthened nickel based superalloy, the yield strength is approximately 690 MPa. Following inertia friction welding, residual stresses as high as 42 ksi (290 MPa) have been measured throughout a significant portion of the weld, which is approximately 43% of the material's yield strength. (In other locations in the weld residual stresses still approach 100% of the material's yield strength.) When the same material is subjected to the instant ISR treatment, residual stresses on the order of 3 ksi (21 MPa) were found in the significant portion of the weld, which is approximately 3% of a gamma prime strengthened nickel based superalloy's yield strength. This shows the ISR treatment yields a substantial reduction in residual stress. Thus, any non-incidental reduction of residual stress in friction welded superalloys, prior to the crack formation that occurs at some point in conventional PWHT, is considered to be within the scope of the invention. For example, a 20% reduction in residual stresses of 43% of the material yield strength produces residual stresses of less than about 35% of the material yield strength. An embodiment describing how the reduction of residual stress is achieved and at what point with respect to the conventional PWHT the residual stress is reduced is discussed below, but the embodiment discussed below is not meant to be limiting.

Figure 3:
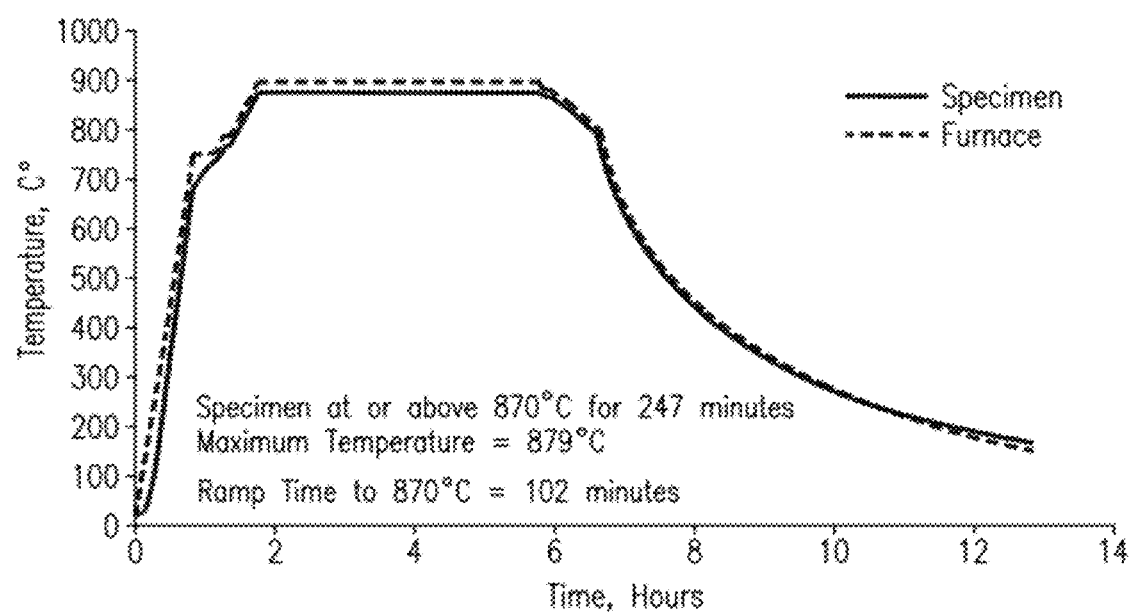
FIG. 3 is a profile of one embodiment of an intermediate stress relief treatment.
Figure 4:
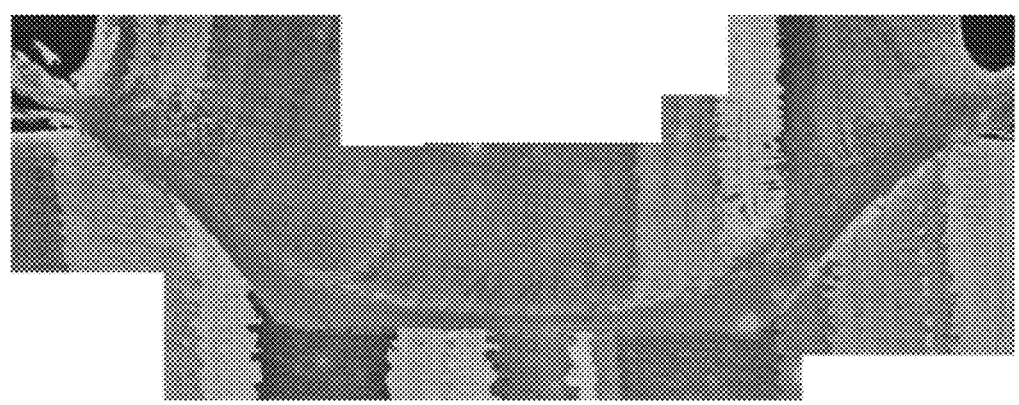
FIG. 4 is a photomicrograph of an inertia friction weld subjected to an ISR treatment, without a crack.

In an embodiment an ISR treatment follows the profile shown in FIG. 3. According to the ISR profile in this embodiment, the assembly is heated to between 870° C. and 879° C. for approximately 247 minutes. A ramp time to ISR treatment temperature is about 102 minutes. Following the ISR treatment the assembly may be cooled, or it may begin the solutionizing treatment of a conventional PWHT. This ISR treatment profile was used on an assembly where both the pin and substrate were made of CM-247-LC®, a gamma prime strengthened nickel based superalloy manufactured by Cannon-Muskegon Corporation of Muskegon Mich. As a result of this ISR profile, residual stresses were reduced from the above-mentioned 42 ksi (290 MPa) to 3 ksi (21 MPa). FIG. 4 shows the final assembly after the ISR treatment and then conventional PWHT. Notably, there is no crack present at the interface of the plug and substrate in the ISR treated assembly. It is important to note that the ISR treatment profile used is not meant to be limiting, but instead exemplary, as stress relief of other hard-to-weld superalloys may require different ISR process temperature, duration, and/or ramp-up etc. However, the idea of more-than incidental residual stress relief regardless of the exact ISR treatment profile applies across all materials.

The ISR treatment may be used to repair cracks in superalloy components such as those used in gas turbine engines. For example, rotor blades and vanes made of gamma prime strengthened nickel based alloys may develop cracks over time in service. Prior to the ISR treatment, repairing a cracked superalloy component with a friction welding process was likely to produce a repaired part with a crack in the repair. Now, the quality of the repair is greatly improved. This may improve the longevity of gas turbine engine parts and reduce the repairs needed throughout their lives, saving money and reducing down time.

Figure 5:
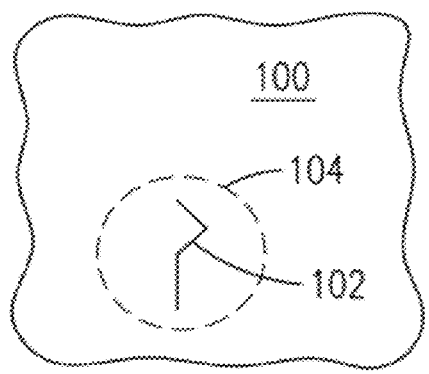
FIG. 5 depicts a crack in a substrate.
Figure 6:
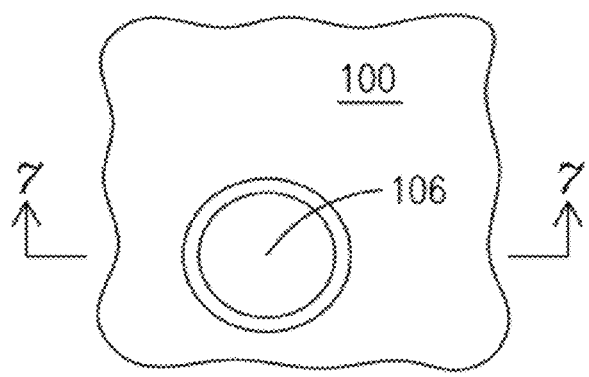
FIG. 6 depicts an excavation of the crack present in the substrate of FIG. 5.
Figure 7:
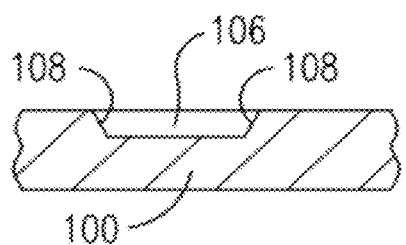
FIG. 7 depicts a side view of the excavation of FIG. 6.

Such repairs may be conducted as depicted in FIGS. 5-11. In FIG. 5 a schematic of a portion of a precipitation hardened superalloy substrate 100 (i.e. a blade) with a crack 102 is visible. The crack 102 may be of any length, direction, and branched configuration. Surrounding the crack 102 is a perimeter 104 of a region to be excavated during the repair. Such excavation may be accomplished by milling, for example. In FIG. 6 a first excavated portion 106 (i.e. a tapered pocket) can be seen. FIG. 7 shows a cross section of the first excavated portion 106. Tapered walls 108 are visible and are used to ensure alignment with a plug and path for metal extrusion during subsequent friction welding. However, crack repair is not limited to shallow, tapered pockets.

Figure 8:
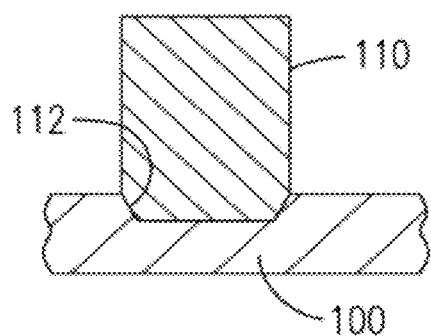
FIG. 8 depicts a plug inertia friction welded to the substrate of FIG. 7.
Figure 9:
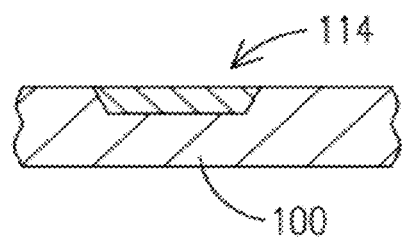
FIG. 9 depicts a repaired substrate.
Figure 10:
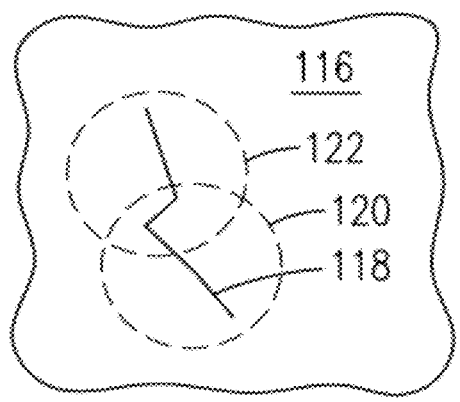
FIG. 10 depicts a large crack in a substrate.

In FIG. 8 a plug 110 with a tapered tip 112 has been spun and friction welded into the first excavated portion 106, material has been plasticized, and the plug 110 and substrate 100 have been bonded (i.e. welded). Excess plug material is removed from the substrate 100 in FIG. 9, thereby forming an assembly 114. However, assembly 114 retains significant residual stresses from the cold working of the inertia welding, and is to undergo the above disclosed ISR treatment followed by conventional PWHT. Upon completion, the repair will be complete.

Crack repair is not limited to cracks of size and configuration that enable a single weld repair. For example, in FIG. 10 a precipitation hardened superalloy substrate 116 with a larger crack 118 is visible. The larger crack 118 is such that a single excavation and single inertia welding operation would not encompass an entirety of the larger crack 118. To accommodate such larger cracks 118, multiple regions may be excavated and multiple welds made. For example, two regions of material may be excavated, as indicated by a perimeter of a first region to be excavated 120, and a perimeter of a second region to be excavated 122. Any number of excavations may be considered and are considered within the scope of this disclosure.

Figure 11:
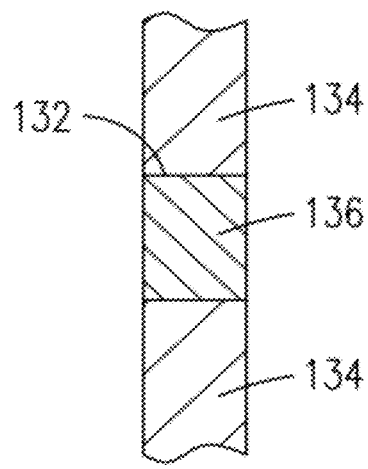
FIG. 11 depicts a large crack repair in a substrate.

In such a multi-excavation repair, each repair may be made as a discrete repair, and all repairs together will encompass the entirety of the crack. For example, as shown in FIG. 11, a first region 124 of a multi region repair 126 may be excavated, inertia welded, and excess plug material removed. A second region 128 may then be excavated, inertia welded, and its excess plug material removed. The multi region repair 126 may then be sent for ISR treatment that may be followed by conventional PWHT to produce a multi region repaired substrate 130.

Figure 12:
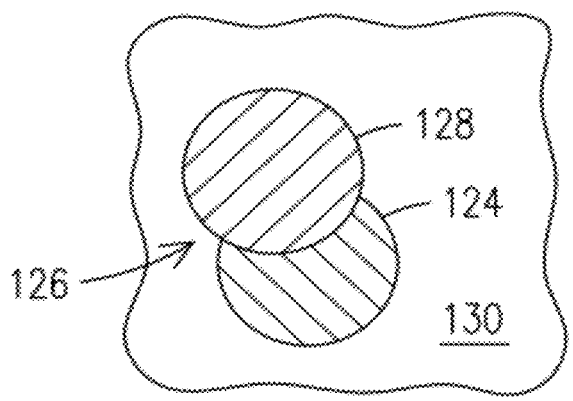
FIG. 12 depicts an inertial friction repair of a substrate with a through-hole.

Any alternate pocket geometry that may work is considered within the scope of the disclosure. Furthermore, instead of removing a pocket, as shown in FIG. 12 a through-hole 132 may be drilled into a substrate 134, and a plug 136 may be inertia friction welded through the substrate, and excess material trimmed from both sides. Plugging may access such through hole from one or both sides of the hole either sequentially or simultaneously and may involve single or multiple tapers.

The ISR treatment and repair techniques disclosed above are not limited to the example material given, but apply to any precipitation hardened superalloy undergoing a plastic weld technique where the residual stresses have produced cracks in conventional PWHT. In addition, as in conventional welding of superalloys, the materials to be welded, such as a pin and substrate, may be preheated. Preheating may reduce precipitates and increase ductility, making the materials more weldable. Preheating may also reduce temperature gradients and reduce residual stresses. Alternately, welding in a chill fixture or under water or under other cooling medium could minimize maximum temperature excursion and time. This could be of advantage in particularly heat sensitive materials that would otherwise form deleterious precipitates, which may be problematic during subsequent heat treatments.

It has been disclosed that the inventor has identified an intermediate stress relief treatment that can avoid the mechanism that form cracks in plastically welded superalloy assemblies undergoing conventional PWHT. The ISR reduces cold worked residual stresses present in the as-welded assemblies, and this reduction of residual stresses reduces crack formation in conventional PWHT of these assemblies. This technique may increase production yield of crack-free parts, and may be utilized in the repair of superalloy components in service that have developed cracks. Increased yield, and improved crack repair represent cost savings and are an improvement over the state of the art.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A method of inertia friction welding a superalloy substrate, the method comprising:
    rotating and forcing a deposit material against the superalloy substrate;
    plastically deforming at least one of the deposit material and the superalloy substrate to form a weld joint joining the deposit material to the superalloy substrate, thereby forming an assembly; and
    heat-treating the assembly, wherein the heat-treating comprises a post-weld intermediate stress-relief (ISR) treatment at an ISR treatment temperature below a solutionizing temperature of the superalloy substrate, followed by a solutionizing treatment, followed by a precipitation hardening heat treatment.

2. The method of claim 1, comprising providing a joint residual stress reduction from before to after the ISR treatment of approximately 20%.

3. The method of claim 1, comprising providing a joint residual stress reduction from before to after the ISR treatment of approximately 90%.

4. The method of claim 1, comprising reducing a joint residual stress after the ISR treatment to less than 35% of a superalloy substrate yield strength.

5. The method of claim 1, comprising reducing a joint residual stress after the ISR treatment to less than 5% of a superalloy substrate yield strength.

6. The method of claim 1, comprising heating the assembly during the ISR treatment to an assembly ISR treatment temperature of at least approximately 870° Celsius.

7. The method of claim 6, comprising performing the ISR treatment for up to approximately four hours.

8. The method of claim 6, comprising heating the assembly to the assembly ISR treatment temperature during a ramp-time of approximately 100 minutes.

9. The method of claim 1, comprising preheating the superalloy substrate and the deposit material prior to the joining step.

10. The method of claim 1, wherein at least one of the superalloy substrate and the deposit material comprises gamma prime strengthened nickel based superalloy.

11. A method of heat treating a plastically welded assembly comprising a plasticized region comprising a superalloy substrate and a deposit material, the method comprising, in order: a post-weld intermediate stress-relief (ISR) treatment at an ISR treatment temperature below a solutionizing temperature of the superalloy substrate, wherein a residual stress in the plasticized region after the ISR treatment is less than 80% of a residual stress in the plasticized region before the ISR treatment; a solutionizing treatment; and an aging heat treatment.

12. The method of claim 11, wherein at least one of the superalloy substrate and the deposit material comprises a gamma prime strengthened nickel based superalloy.

13. The method of claim 12, wherein during the ISR treatment the plasticized region reaches an ISR treatment plasticized region temperature of at least approximately 870° Celsius, and wherein the ISR treatment lasts for up to approximately four hours.

14. The method of claim 13, wherein the ISR treatment comprises a ramp-time of approximately 100 minutes for the plasticized region to reach the ISR treatment temperature.

15. A method of repairing a crack in a superalloy substrate, the method comprising:
    excavating first material thereby forming a first excavated portion of the superalloy substrate;

rotating and forcing a deposit material into the first excavated portion of the superalloy substrate;

plastically deforming at least one of the deposit material and the superalloy substrate to form a weld joint joining the deposit material to the superalloy substrate, thereby forming an assembly; and heat-treating the assembly, wherein the heat-treating comprises: a post-weld intermediate stress-relief (ISR) treatment at an ISR treatment temperature below a solutionizing temperature of the superalloy substrate and effective to reduce a cold working stress in the joint to below 35% of a superalloy substrate yield strength, followed by a solutionizing treatment, followed by a precipitation hardening heat treatment.

16. The method of claim 15, wherein at least one of the superalloy substrate and the deposit material comprises a gamma prime strengthened nickel based superalloy.

17. The method of claim 15, wherein a deposit material tip is configured to fit into and fill the first excavated portion of the superalloy substrate.

18. The method of claim 15, wherein the forming a first excavated portion comprises forming a through-hole in the superalloy substrate.

* * * * *